US008040959B2

(12) United States Patent
Waters et al.

(10) Patent No.: US 8,040,959 B2
(45) Date of Patent: Oct. 18, 2011

(54) DYNAMIC RESOURCE ALLOCATION TO IMPROVE MIMO DETECTION PERFORMANCE

(75) Inventors: Deric W. Waters, Dallas, TX (US); Naftali Sommer, Rishon le Zion (IL); Anuj Batra, Dallas, TX (US); Srinath Hosur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1000 days.

(21) Appl. No.: 11/926,966

(22) Filed: Oct. 29, 2007

(65) Prior Publication Data
US 2008/0137762 A1 Jun. 12, 2008

Related U.S. Application Data

(60) Provisional application No. 60/869,497, filed on Dec. 11, 2006.

(51) Int. Cl.
*H04K 1/10* (2006.01)
*H04L 27/28* (2006.01)
(52) U.S. Cl. ......... 375/260; 375/346; 375/347; 375/356
(58) Field of Classification Search .................. 375/260, 375/259, 262, 261, 346, 333, 360, 152
See application file for complete search history.

(56) References Cited

U.S. PATENT DOCUMENTS

| | | | | |
|---|---|---|---|---|
| 5,291,499 | A * | 3/1994 | Behrens et al. | 714/796 |
| 5,867,478 | A * | 2/1999 | Baum et al. | 370/203 |
| 6,032,284 | A * | 2/2000 | Bliss | 714/792 |
| 6,410,239 | B1 * | 6/2002 | Nandabalan et al. | 435/6.13 |
| 7,216,267 | B2 * | 5/2007 | Santraine et al. | 714/709 |
| 7,289,814 | B2 * | 10/2007 | Amir et al. | 455/456.1 |
| 7,299,135 | B2 * | 11/2007 | Thayer | 702/21 |
| 7,424,063 | B2 * | 9/2008 | Yee | 375/267 |
| 7,773,790 | B2 * | 8/2010 | Cork et al. | 382/128 |
| 2005/0002441 | A1 * | 1/2005 | Rovini et al. | 375/141 |
| 2008/0019262 | A1 * | 1/2008 | Lillie et al. | 370/208 |

OTHER PUBLICATIONS

Hochwald, Bertrand M. et al., "Achieving Near-Capacity on a Multiple-Antenna Channel," IEEE Transactions on Communications, vol. 51, No. 3, Mar. 2003, pp. 389-399. Waters, Deric, "Signal Detection Strategies and Algorithms for Multiple-Input Multiple-Output Channels," A Thesis Presented to the Academic Faculty, Georgia Institute of Technology, Dec. 2005, 122 pages. Found at: http://smartech.gatech.edu/handle/1853/7514.
Wubben, D. et al., "Efficient Algorithm for Decoding Layered Space-Time Codes," Electronics Letters, Oct. 25, 2001, vol. 37, No. 22, pp. 1348-1350.

* cited by examiner

*Primary Examiner* — Khanh C Tran
*Assistant Examiner* — Qutbuddin Ghulamali
(74) *Attorney, Agent, or Firm* — Steven A. Shaw; W. James Brady; Frederick J. Telecky, Jr.

(57) ABSTRACT

A method and apparatus for detecting symbols in a Multiple-Input Multiple-Output Orthogonal Frequency Division Multiplexing ("MIMO-OFDM") system. A MIMO-OFDM receiver includes a first detector that estimates a symbol of a first MIMO-OFDM sub-carrier and a second detector that estimates a symbol of a second MIMO-OFDM sub-carrier. The second detector differs in complexity from the first detector. A detector control block is coupled to the detectors. The detector control block assigns the first detector to process the first MIMO-OFDM sub-carrier and assigns the second detector to process the second MIMO-OFDM sub-carrier. The detector control block computes a list metric for a sub-carrier. Based on the list metric the detector control block assigns a candidate symbol list length to the detector processing the sub-carrier. Alternately, the detector control block assigns one of a variety of detector types to a sub-carrier based on the sub-carrier list metric.

4 Claims, 4 Drawing Sheets

DYNAMIC RESOURCE ALLOCATION TO IMPROVE MIMO DETECTION PERFORMANCE

CROSS-REFERENCE TO RELATED APPLICATIONS

The present application claims priority to U.S. provisional patent application Ser. No. 60/869,497, filed Dec. 11, 2006, and entitled "Dynamic Resource Allocation to Improve Performance of MIMO Detection" hereby incorporated herein by reference.

BACKGROUND

As consumer demand for high data rate applications, such as streaming video, expands, technology providers are forced to adopt new technologies to provide the necessary bandwidth. Multiple Input Multiple Output ("MIMO") is an advanced radio system that employs multiple transmit antennas and multiple receive antennas to simultaneously transmit multiple parallel data streams. Relative to previous wireless technologies, MIMO enables substantial gains in both system capacity and transmission reliability without requiring an increase in frequency resources.

MIMO systems exploit differences in the paths between transmit and receive antennas to increase data throughput and diversity. As the number of transmit and receive antennas is increased, the capacity of a MIMO channel increases linearly, and the probability of all sub-channels between the transmitter and receiver fading simultaneously decreases exponentially. As might be expected, however, there is a price associated with realization of these benefits. Recovery of transmitted information in a MIMO system becomes increasingly complex with the addition of transmit antennas.

Many MIMO detection algorithms have been proposed. The maximum-likelihood detector, while conceptually simple and exhibiting optimal detection performance, is often impractical because its complexity increases exponentially with the number of input channels. Consequently, a variety of algorithms have been proposed to solve the detection problem with reduced complexity while sacrificing minimal performance. A summary of many previously proposed MIMO detectors is given in Deric W. Waters, Signal Detection Strategies and Algorithms for Multiple-Input Multiple-Output Channels (December 2005) (unpublished Ph.D. dissertation, Georgia Institute of Technology), http://etd.gatech.edu. In Bernard M. Hochwald & Stephan ten Brink, *Achieving Near-Capacity on a Multiple-Antenna Channel*, 51 IEEE TRANSACTIONS ON COMMUNICATIONS 389-99 (2003), the list-sphere detector was proposed as a way to compute the log-likelihood ratio (LLR) for the channel input. The list-sphere detector is one member of a large class of list detectors.

A MIMO system may employ orthogonal frequency division multiplexing ("OFDM") to increase spectral efficiency, reduce frequency-selective fading, and combat inter-symbol interference ("ISI") without computationally intensive equalization. OFDM partitions a high-speed data signal into a number of lower-speed signals that are transmitted in parallel over sub-divisions of the system bandwidth known as sub-carriers or tones. MIMO detection is applied to each of the tens or hundreds of sub-carriers of a MIMO-OFDM system. Therefore, efficient allocation of computational resources to MIMO-OFDM sub-carrier detectors is desirable. Note that the term OFDM as used herein also includes OFDMA systems where a given receiver only processes a subset of the tones in the OFDM symbol.

SUMMARY

A variety of novel techniques for Multiple-Input Multiple-Output ("MIMO") Orthogonal Frequency Division Multiplex ("OFDM") detection are herein disclosed. The disclosed techniques vary the candidate symbol list length assigned to MIMO list detectors applied across the sub-carriers of an OFDM symbol. Varying the candidate list length allows a receiver to trade off performance and complexity in an efficient manner. The term "complexity," as used herein, refers to the number of steps or computations required to perform an operation, in this case MIMO detection. Thus, a higher complexity detector requires more operations or computations to perform MIMO detection than does a lower complexity detector. In accordance with at least some embodiments, a method includes receiving a first MIMO-OFDM sub-carrier and receiving a second MIMO-OFDM sub-carrier. The method further includes assigning a detector having a first complexity to estimate a symbol of the first MIMO-OFDM sub-carrier, and assigning a detector having a second complexity to estimate a symbol of the second MIMO-OFDM sub-carrier. The first complexity is different than the second complexity. Symbol estimates produced by the first detector and the second detector are provided to a decoder to produce decoded data.

In other embodiments, a MIMO receiver includes a first detector that estimates a symbol of a first MIMO-OFDM sub-carrier, and a second detector that estimates a symbol of a second MIMO-OFDM sub-carrier. The second detector differs in complexity from the first detector. A detector control block is coupled to the detectors. The detector control block assigns the detector of first complexity to process the first MIMO-OFDM sub-carrier and assigns the detector of second complexity to process the second MIMO-OFDM sub-carrier.

In yet other embodiments, apparatus includes a MIMO-OFDM transmitter and a MIMO-OFDM receiver. The MIMO-OFDM receiver includes a first detection means for estimating a symbol of a MIMO-OFDM sub-carrier. The MIMO-OFDM receiver also includes a second detection means for estimating a symbol of a MIMO-OFDM sub-carrier. The second detection means differs in complexity from the first detection means. The MIMO-OFDM receiver further includes a detector assignment means for assigning the first detection means to a first MIMO-OFDM sub-carrier and for assigning the second detection means to a second MIMO-OFDM sub-carrier.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" and "e.g." are used in an open-ended fashion, and thus should be interpreted to mean "including, but not limited to . . . ". The term "couple" or "couples" is intended to mean either an indirect or direct connection. Thus, if a first component couples to a second component, that connection may be through a direct connection, or through an indirect connection via other components and connections. The term "system" refers to a collection of two or more hardware and/or software components, and may be used to refer to an electronic device or devices, or a subsystem thereof. Further, the term "software" includes any executable code capable of running on a processor, regardless of the media used to store the software. Thus, code stored in non-volatile memory, and sometimes referred to as "embedded firmware," is included within the definition of software.

BRIEF DESCRIPTION OF THE DRAWINGS

In the following detailed description, reference will be made to the accompanying drawings, in which.

The drawings show illustrative embodiments that will be described in detail. However, the description and accompanying drawings are not intended to limit the claimed invention to the illustrative embodiments, but to the contrary, the intention is to disclose and protect all modifications, equivalents, and alternatives falling within the spirit and scope of the appended claims.

DETAILED DESCRIPTION

Disclosed herein are various systems and methods for performing signal detection in a multiple input multiple output ("MIMO") orthogonal frequency division multiplex ("OFDM") receiver. Embodiments of the present disclosure allocate computational resources to the sub-carrier detectors in a manner that considers the performance-complexity tradeoff presented by MIMO detection methods. Some embodiments of the invention allocate computational resources by assigning a candidate list length to a list detector based on the quality of the sub-carrier processed by the detector. Other embodiments of the invention allocate computational resources by assigning different detector types to process different sub-carriers based on the quality of the sub-carriers.

OFDM effectively transforms a wideband channel into many narrow band channels. The MIMO detection problem can be described for the k-th tone using the narrowband channel model written as:

$$r_k = H_k a_k + w_k \tag{1}$$

where $H_k$ is an M×N matrix, $a_k = [a_{k,1}\ a_{k,2}\ \ldots\ a_{k,N}]^T$ is an N dimensional vector of symbols that may be drawn from different alphabets, and the noise has the autocorrelation matrix $E[w_k w_k^*] = \Sigma^2$. The present disclosure focuses on the case where $\Sigma^2 = I\sigma^2$, but those skilled in the art will recognize that the concepts are extendable to the more general cases. For example, the channel output could be left multiplied by the matrix $\Sigma^{-1}$ to achieve an effective channel whose noise has an identity autocorrelation matrix. The number of tones in the OFDM symbol may be denoted as T.

Some embodiments of a list detector use a QR decomposition of the channel. This decomposition is defined as follows:

$$\begin{bmatrix} H_k \\ \alpha \hat{\sigma} I \end{bmatrix} \Pi_k = \begin{bmatrix} Q_k \\ \alpha \hat{\sigma} \Pi R_k^{-1} \end{bmatrix} R_k \tag{2}$$
$$= \tilde{Q}_k R_k$$

where $\tilde{Q}_k$ is an (M+N)×N matrix with orthonormal columns, $R_k$ is an N×N triangular matrix with positive and real diagonals, $\Pi_k$ is an N×N permutation matrix, $\hat{\sigma}$ is an estimate of $\sigma$, and $\alpha$ is a non-negative real number. When $\alpha=1$ the QR decomposition provides the minimum mean-squared error ("MMSE") detector implementation, and when $\alpha=0$ it provides the zero-forcing ("ZF") detector implementation. In the present disclosure, a permutation matrix includes any matrix whose elements are either one or zero, and each column and each row contain only a single non-zero element. This disclosure describes the algorithm assuming an upper triangular $R_k$ matrix, but those skilled in the art will recognize that the algorithm can easily be extended to describe a lower triangular matrix.

The optimal value of the parameter $\alpha$ depends on the type of MIMO detector that is desired. For example, $\alpha=1$ is optimal for the linear receiver because it minimizes the mean squared error ("MSE"), $\|R^{-1}Q^H y - s\|^2$. On the other hand, $\alpha=0$ is optimal for the Max-Log("ML") receiver.

The definition of the permutation matrix $\Pi$ impacts performance for some MIMO detectors. For example, the Bell Labs Layered Space Time ("BLAST") ordering, as disclosed in Gerald J. Foschini et al., *Simplified Processing for High Spectral Efficiency Wireless Communication Employing Multi-Element Arrays*, 17 IEEE J. ON SELECTED AREAS IN COMM. 1841-52 (1999), chooses $\Pi$ to maximize the minimum diagonal of R. A less complex way to choose $\Pi$ is the sorted-QR decomposition, disclosed in D. Wubben, *Efficient Algorithm for Decoding Layered Space-Time Codes*, 37 ELECTRONIC LETTERS 1348-50 (2001), that attempts to maximize $R_{1,1}$ (lower triangular R).

The MIMO detector problem can be simplified by creating an effective channel that is triangular. One method of triangularizing a channel uses the conjugate transpose of Q (resulting from the QR decomposition of the channel H) as follows:

$$y_k = Q_k^H r_k = R_k s_k + n_k, \tag{3}$$

where $s_k = \Pi_k^{-1} a_k = [s_{k,1}\ s_{k,2}\ \ldots\ s_{k,N}]^T$ is a permutation of the channel input vector, and $n_k$ is an effective noise. Note that $n_k$ may be a function of $a_k$ when a $\alpha \neq 0$. The constellation for the i-th symbol is defined as $s_{k,i} \in A_i$. The set containing all valid values of a subset of the channel inputs is denoted as $A_{N_1}^{N_2}$, thus $[s_{N_1}, s_{N_1+1}, \ldots, s_{N_2}]^T \in A_{N_1}^{N_2}$ where $N_1 \leq N_2$. The set that contains all the elements of any multi-dimensional constellation $A_{N_1}^{N_2}$ whose j-th bit in the i-th symbol have the value k is denoted as $A_{N_1}^{N_2}(k,i,j)$. Note that for notational simplicity, the subscript that denotes the tone index is neglected unless necessary throughout the remainder of this disclosure.

The output of the ML detector is the log-likelihood ratio ("LLR") of each bit transmitted in the vector s. The LLR value indicates the probability that a given bit was transmitted as a one or zero. The ML detector output for the j-th bit of the i-th symbol is described by a single equation:

$$\lambda_{i,j} = (\|r-H\Pi s^{(o)}\|^2 - \|r-H\Pi s^{(1)}\|^2)/\hat{\sigma}^2, \quad (4)$$

where $s^{(k)}$ minimizes $\|r-H\Pi s^{(k)}\|^2$ under the constraint that $s^{(k)} \in A_1^N(k,i,j)$. The value $\|r-H\Pi x\|^2$ is defined as the cost of the vector X.

The ML detector may also be defined using the equivalent triangular channel model:

$$\lambda_{i,j} = (\|y-Rs^{(o)}\|^2 - \|y-Rs^{(1)}\|^2)/\hat{\sigma}^2, \quad (5)$$

where $s^{(k)} \in A_1^N(k,i,j)$ minimizes $\|y-Rs^{(k)}\|^2$, $\alpha = 0$, and $\Pi$ can be any permutation matrix. Note that $\|y-Rx\|^2 = \|r-H\Pi x\|^2$ when $\alpha = 0$.

Many existing MIMO detectors are classified as list detectors. A list detector is any detector that generates a list of candidate vectors for the channel input. The set of candidate vectors is labeled as the set L, and the number of candidates in the set is called the list length. The ML detector is a list detector that enumerates all possible channel inputs. Many list detectors reduce complexity by generating lists that are as small as possible without sacrificing too much performance.

Given the set L generated by any list detector, the LLR for the j-th bit of the i-th symbol may be computed in a manner similar to the ML detector in Equation 4. Specifically, if no equalization is used the LLRs can be computed from the set L according to:

$$\lambda_{i,j} = (\|r-H\Pi s^{(o)}\|^2 - \|r-H\Pi s^{(1)}\|^2)/\hat{\sigma}^2 \quad (6)$$

where $s^{(k)}$ minimizes $\|r-H\Pi s^{(k)}\|^2$ under the constraint that $s^{(k)} \in L(k,i,j)$ and $L \subset A_1^N$. The triangular channel model can be used to define the LLRs when equalization is used according to Equation 3:

$$\lambda_{i,j} = (\|y-Rs^{(o)}\|^2 - \|y-Rs^{(1)}\|^2)/\hat{\sigma}^2 \quad (7)$$

where $\|y-Rs^{(k)}\|^2$ is minimized subject to the constraint $s^{(k)} \in L(k,i,j)$ and $L \subset A_1^N$. This expression is mathematically equivalent to Equation 6 when $\alpha = 0$.

The complexity of many list detectors is directly related to their list length, which is the size of the candidate list they generate. Longer lists require more computations to generate, and longer lists require computation of more mean-squared errors as in Equation 7. On the other hand, list detectors generally perform better with longer lists. Thus, there is an inherent performance-complexity trade-off for list detectors that is controlled by their list length. In a MIMO-OFDM system, a list detector may be applied to each tone independently to perform MIMO detection. Embodiments of the invention disclosed herein distribute the available computational resources across tones in such a way as to improve performance. For example, embodiments of the invention may apply a list detector with a large list length to tones with poorly conditioned channels, and apply a list detector with a shorter list length to tones with well conditioned channels. Some embodiments may apply a detector with a small (or possibly zero) list length to tones so poorly conditioned that applying a longer list would be a waste of computational resources. This effectively erases the information from those tones and relies on the forward-error correction decoder to recover the information. Embodiments of the invention may distribute list lengths in such a way that the total complexity of MIMO detection across all tones is constant. By adjusting the list length of a list detector in this way, embodiments of the invention improve performance without increasing the overall complexity of MIMO detection over the OFDM symbol.

Embodiments of the invention apply a list metric to determine the list length or detector type to be assigned to each tone. A list metric may be defined as a measurement of the difficulty of correctly recovering the bits from a MIMO-OFDM sub-carrier. The metric may be a function of the channel, the signal-to-noise ratio ("SNR"), and the list length assigned to a tone. The list metric for the k-th tone may be denoted $f(H_k, \sigma, L_k)$, where $L_k$ is the list length. By defining the list metric as a function of $L_k$, embodiments of the invention assess the impact of a given value of $L_k$ on the list metric in determining the list length distribution across tones. When a selected list detector is used on each tone (with different list lengths on each tone) then a preferred list metric is the probability that the true channel input belongs to the list L. Mathematically, this may be expressed as:

$$f(H_k, \sigma, L_k) = Pr[a \in L | H_k, \sigma, L_k].$$

The method by which this quantity is computed depends on the MIMO detector implementation. The following is a non-exclusive list of alternative list metrics that may be used to approximate $Pr[a \in L | H_k, \sigma, L_k]$. These exemplary list metrics comprise various ways to define post-detection signal-to-noise ratio. Variations of these list metrics may also be used as one skilled in the art will appreciate.

1. $f(H_k, \sigma, L_k) = \alpha(L_k) \cdot [R_k]_{1,1}$

2. $f(H_k, \sigma, L_k) = \alpha(L_k) \cdot \min_{i \in \{1, \ldots, N\}} ([R_k]_{i,i})$ 3. $f(H_k, \sigma, L_k) = \alpha(L_k) \cdot \sum_{j=1}^{N} \sum_{i=1}^{M} |[H_k]_{i,j}|^2$ 4. $f(H_k, \sigma, L_k) = \alpha(L_k) \cdot \min_{j \in \{1, \ldots, N\}} \sum_{i=1}^{M} |[H_k]_{i,j}|^2$ 5. $f(H_k, \sigma, L_k) = \alpha(L_k) \cdot \min_{j \in \{1, \ldots, N\}} \Gamma_{j,k}$ 6. $f(H_k, \sigma, L_k) = \alpha(L_k) \cdot \prod_{i=1}^{N} [R_k]_{i,i}$ 7. $f(H_k, \sigma, L_k) = \alpha(L_k) \cdot \max_{i \in \{1, \ldots, N\}} \sum_{j=1}^{N} |[(R_k)^{-1}]_{i,j}|^2$ where $\alpha(L_k)$ is a list gain factor that depends on the symbol constellation, and $\Gamma_{j,k}$ is the j-th eigenvalue of $H_k$. The notation $[R]_{i,j}$ has been used to represent the element found at the i-th row and j-th column of the matrix R. One possible list gain is $\alpha(L_k) = \sqrt{L_k}$, or if the list metric need not depend on the list length $\alpha(L_k)$ could simply be a constant. In addition, the list gain could be inversely proportional to the noise variance $\alpha(L_k) = \sqrt{L_k}/\sigma^2$ or $\alpha(L_k) = 1/\sigma^2$. When $f(H_k, \sigma, L_k)$ does not actually depend on the list length it may be thought of as a subcarrier quality metric. As a matter of convenience, the present disclosure assumes that a larger list metric indicates better performance. However the present disclosure also encompasses use of a lower list metric to indicate better performance. For example, a lower probability of bit error may indicate better performance than a higher probability of bit error, while a higher post-detection SNR may indicate better performance than a lower post-detection SNR. Also, smaller values of the seventh list metric in the above list indicate better performance, while higher values of the other six listed examples indicate better performance. Embodiments of the invention assign a value of $L_k$ for each tone, while keeping the complexity across all tones fixed. To be more precise, the value C, the maximum complexity across all tones, may be constrained to be the same regardless of the values chosen for $\{L_k\}$:

$$C \geq \sum_{k=1}^{T} L_k.$$

Rather than using the same list detector and varying the list length across sub-carriers, some embodiments of the invention allocate computational resources by assigning different types of detectors to different sub-carriers. For example, a linear minimum mean squared error ("MMSE") detector may be used on stronger tones, and a list detector used on weaker tones.

Figure 1:
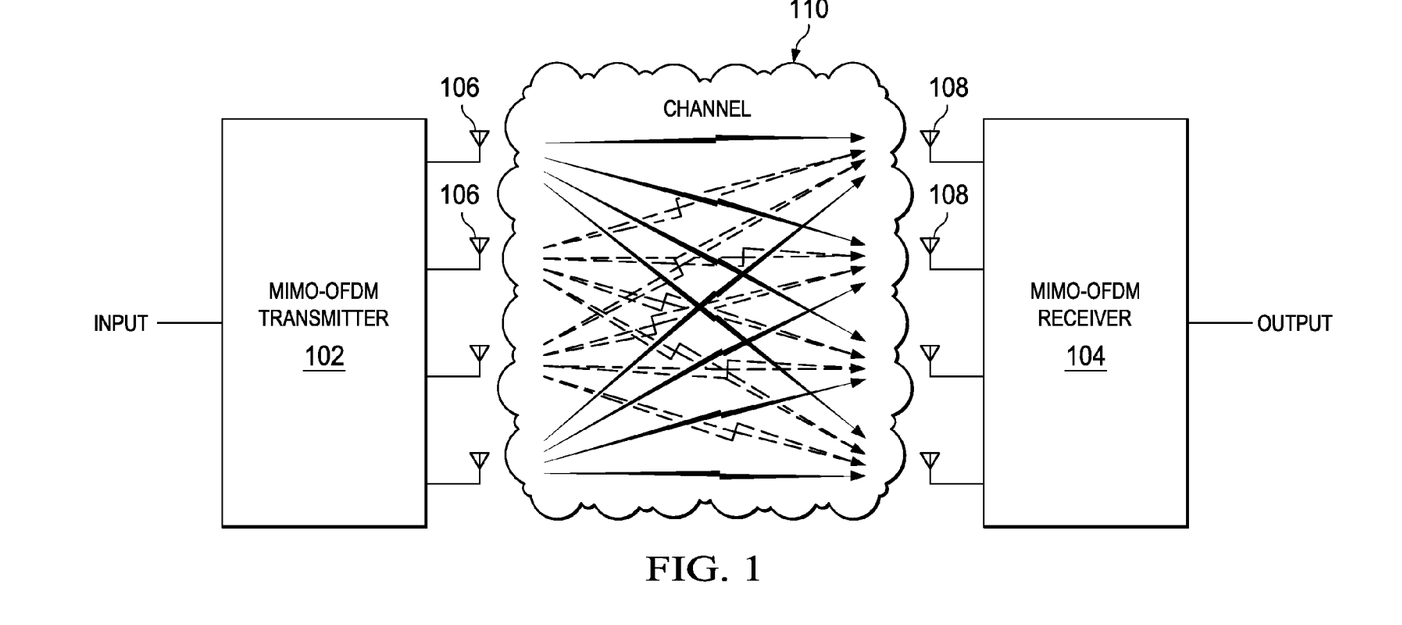
FIG. 1 shows an illustrative Multiple Input Multiple Output ("MIMO") Orthogonal Frequency Division Multiplex ("OFDM") network in accordance with embodiments of the invention.

FIG. 1 shows an illustrative embodiment of a MIMO-OFDM system in accordance with embodiments of the invention. MIMO-OFDM transmitter 102 includes one or more antennas 106 for transmitting radio frequency signals. Signals transmitted by MIMO-OFDM transmitter 102 are partitioned into multiple sub-signals and transmitted on a plurality of orthogonal sub-carriers or tones. MIMO-OFDM transmitter 102 may, in general, be a fixed or portable wireless device, a cellular phone, a personal digital assistant, a wireless modem card, or any other device configured to transmit on a MIMO-OFDM wireless network.

MIMO-OFDM receiver 104 is configured to receive radio frequency signals transmitted by MIMO-OFDM transmitter 102. MIMO-OFDM receiver 104 may, in general, be a fixed or portable wireless device, a cellular phone, a personal digital assistant, a wireless modem card, or any other device configured to transmit on a MIMO-OFDM wireless network. MIMO-OFDM receiver 104 includes one or more antennas 108 for receiving transmitted radio frequency signals. MIMO-OFDM receiver 104 applies a MIMO detector to each OFDM sub-carrier received. As the sub-carriers traverse channel 110, between transmitter 102 and receiver 104, the sub-carriers are subjected to varying degrees of distortion. Some embodiments of receiver 104 may apply a single pre-selected detector to each sub-carrier. Such an embodiment may commit too few computational resources to poor sub-carriers and too many resources to better sub-carriers, thus making inefficient use of the receiver's 104 computational resources. Rather than applying a pre-selected detector to each sub-carrier, receiver 104 preferably includes an embodiment of the invention disclosed herein to tailor the complexity of the detector applied to each sub-carrier in accordance with the quality of the received signal. Receiver 104 may thus apply more complex detectors to lower quality sub-carriers and less complex detectors to higher quality sub-carriers resulting in efficient use of the receiver 104 computational resources while attaining optimal detection performance. In some cases the receiver may choose not to process very low quality sub-carriers in order to spend those computational resources on other sub-carriers where they will be more beneficial. Embodiments of the invention may tailor the complexity of the detector applied to a sub-carrier by selecting a candidate list length for a list detector, or by selecting a particular type of more or less complex detector.

Figure 2:
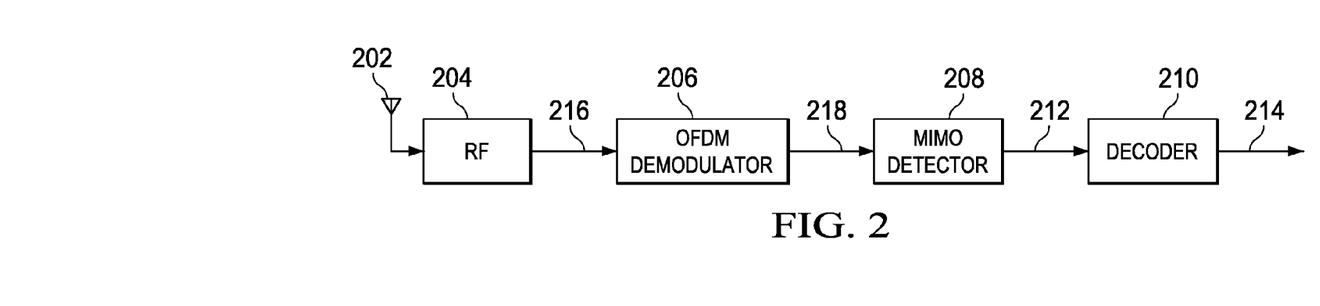
FIG. 2 shows an illustrative block diagram of a MIMO-OFDM receiver in accordance with at least some preferred embodiments of the invention.

FIG. 2 shows an illustrative block diagram of a MIMO-OFDM receiver in accordance with at least some preferred embodiments of the invention. Radio frequency ("RF") signals are received by antenna 202 and provided to RF block 204. RF block 204 downconverts the radio frequency signals to baseband, digitizes the baseband signals and performs other processing, such as amplification and filtering. The digitized baseband signals 216 are provided to OFDM demodulator 206.

The OFDM demodulator 206 demodulates the digitized baseband signals 216 to extract a plurality of sub-carriers from the received signals. The OFDM demodulator 206 removes the cyclic prefix attached to each OFDM symbol as an aid to inter-symbol interference prevention, and transforms the resulting signals to the frequency domain to provide the symbols of the sub-carriers used to transmit the OFDM symbol. The demodulated sub-carriers 218 are provided to MIMO detector 208. The cyclic prefix may be created at the transmitter by copying the last N samples of the IFFT output and pre-appending them to the IFFT output. As one skilled in the art can appreciate, other methods exist for implementing the cyclic prefix. For example, a zero-padded prefix or suffix (N zero samples), or a known pseudorandom pilot sequence.

MIMO detector 208 processes the OFDM sub-carriers 218 to provide symbol decisions for each bit transmitted by the MIMO-OFDM transmitter 102. The symbol decisions may be represented as log-likelihood ratios ("LLRs") or other hard or soft decision estimates for the transmitted bits.

Figure 3:
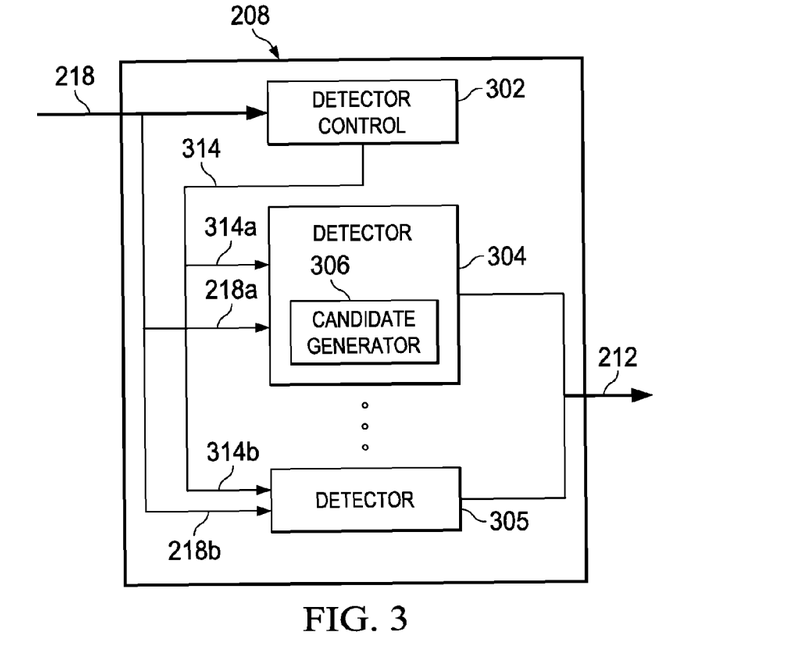
FIG. 3 shows an illustrative block diagram of a MIMO-OFDM detector in accordance with at least some preferred embodiments of the invention.

FIG. 3 shows an illustrative block diagram of an embodiment of a MIMO-OFDM detector 208 in accordance with at least some preferred embodiments of the invention. The embodiment illustrated includes a detector control block 302 and one or more list detectors 304. Each list detector 304 includes a candidate generator 306 to provide a set of candidate values for a transmitted symbol.

Demodulated sub-carrier data 218 is provided to detector control block 302 which processes the sub-carrier data 218 to produce a list metric for each sub-carrier. The list metric is a measurement of how difficult it may be to correctly recover the bits for a sub-carrier. As noted above, the list metric may be, for example, a function of the channel, the signal-to-noise ratio, and the list length applied to detect symbols of the sub-carrier. The detector control block 302 assigns a candidate list length 314a to a list detector 304 in accordance with the computed list metric for the sub-carrier 218a processed by the list detector 304. The detector control block 302 also considers the total computational capacity available to implement detector 304 when assigning list length 314a to detector 304. Similarly, the detector control block 302 assigns a candidate list length 314b to a list detector 305 in accordance with the computed list metric for the sub-carrier 218b processed by the list detector 305. List lengths 314a and 314b may differ according to the list metrics computed for the sub-carriers 218a and 218b. The total list length 314 assigned to all detectors 304, 305 should not exceed the available detector computational capacity.

The detector control block 302 may apply a variety of methods, as disclosed below to assign a list length 314 to a detector 304, 305. In some embodiments, longer list lengths may be assigned to lower quality sub-carriers, and shorter list lengths may be assigned to higher quality sub-carriers. Extremely weak sub-carriers, for example sub-carriers having strength below a predetermined threshold value, may be assigned short, or zero, list lengths to avoid wasting computational resources. Sub-carrier strength may be ascertained, for example, by evaluating the sub-carrier list metric or by other means.

In some embodiments of MIMO detector 208, the detector control block 302 may assign detector types of varying complexity to sub-carriers 218 as a means of optimizing detection performance and allocating computational resources, rather than allocating list length to list detectors. In such embodiments, detector types are assigned to the sub-carriers based on sub-carrier quality and available computational resources.

MIMO detector 208 and its sub-systems (i.e. detection means, detector assignment means, list metric determination means, list assignment means, etc.) may be implemented using, for example, a digital signal processor, or other processor, and associated software, fixed or programmable logic systems, a combination thereof, or their equivalents.

Detectors 304 provide symbol estimates 212 for each transmitted bit of the processed sub-carriers 218. The estimates are provided to decoder 210 which uses the estimates to produce decoded data 214.

Figure 4:
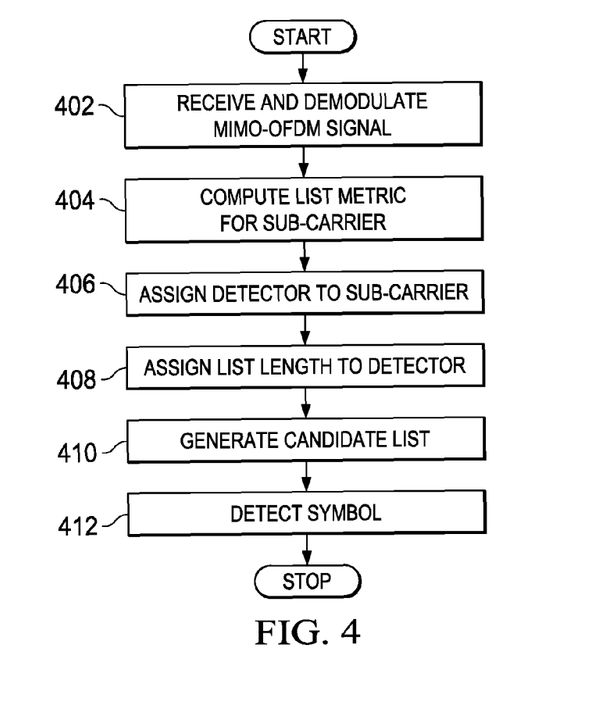
FIG. 4 shows a flow diagram for an illustrative method for MIMO-OFDM detection in accordance with at least some preferred embodiments of the invention.

FIG. 4 shows a flow diagram for an illustrative method for MIMO-OFDM detection in accordance with at least some preferred embodiments of the invention. Though depicted sequentially as a matter of convenience, at least some of the actions shown can be performed in a different order and/or performed in parallel. In block 402, a MIMO-OFDM signal is received, downconverted to baseband and digitized. The digitized baseband signal is demodulated. The cyclic prefix is removed from each OFDM symbol and the symbol is transformed into the frequency domain to extract the OFDM sub-carriers.

A list metric is computed for each sub-carrier in block 404. The list metric is a measurement of how difficult it may be to correctly recover the bits for a sub-carrier. Probability of bit error and post-detection signal-to-noise ratio are examples of two possible list metrics. After a list metric is computed, in block 406, a detector is assigned to the sub-carrier associated with the list metric. The detector may be a list detector or other type of detector, for example a linear detector, in accordance with the quality of the sub-carrier and the available computational resources for implementing the detector. In another embodiment, the receiver may, for example, assign a low-complexity linear detector if the list metric is above/below a threshold, otherwise it may assign a list detector of a predetermined size.

If a list detector is assigned to the sub-carrier, a list length is assigned to the list detector in block 408. Similar to the detector assignment described above, list detector list length may be assigned in accordance with the quality of the sub-carrier and the computational resources available.

In block 410, for those sub-carriers to which list detectors were assigned, lists of candidates for transmitted symbols are generated according to the previously assigned list lengths. These candidate lists are used to detect symbols (i.e. generate symbol estimates) in block 412. For sub-carriers to which a non-list detector was assigned (a linear detector, etc.) the LLRs are computed directly using known techniques to detect the symbols.

Figure 5:
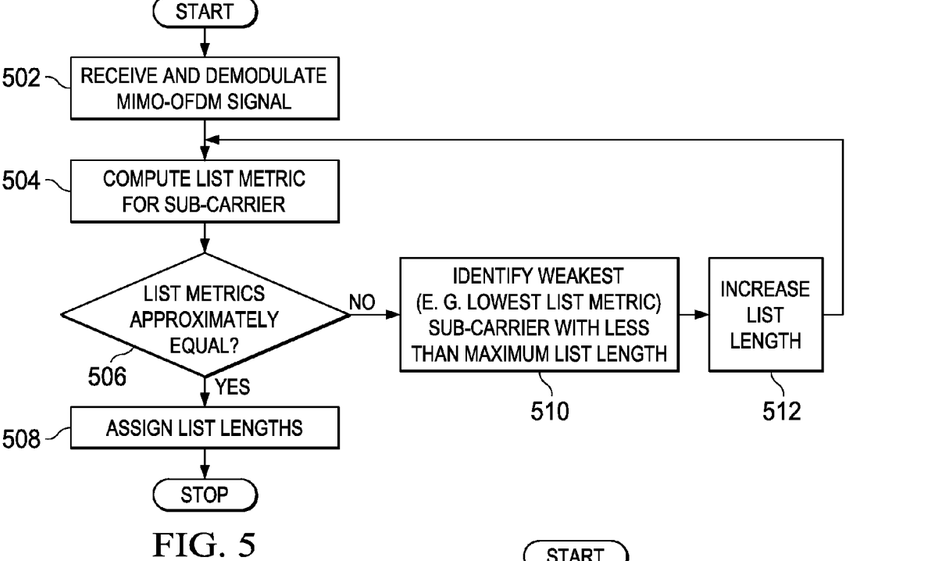
FIG. 5 shows a flow diagram for a method for selecting a candidate list length in accordance with at least some preferred embodiments of the invention, when initial list metrics for all sub-carriers have been previously determined.

FIG. 5 shows a flow diagram for a method for selecting a candidate list length in accordance with at least some preferred embodiments of the invention, when initial list metrics for all sub-carriers are determined prior to list length assignment. Though depicted sequentially as a matter of convenience, at least some of the actions shown can be performed in a different order and/or performed in parallel. In block 502, a MIMO-OFDM signal is received, downconverted to baseband and digitized. The digitized baseband signal is demodulated. The cyclic prefix is removed from each OFDM symbol and the symbol is transformed into the frequency domain to extract the OFDM sub-carriers.

List metrics are computed for all sub-carriers in block 504. A list metric is a measurement of how difficult it may be to correctly recover the bits for a sub-carrier. Probability of bit error and post-detection signal-to-noise ratio are examples of two possible list metrics. The present method attempts to equalize the list metrics for all sub-carriers, $f(H_i,\sigma,L_i) \cong f(H_j,\sigma,L_j)$, by increasing the list length assigned for detecting the sub-carrier with the smallest list metric that has a less than maximal list length. Thus, in block 506, if the list metrics for all sub-carriers are approximately equal, then the list lengths are assigned to the detectors in block 508, and the list length assignment process is complete. If the list metrics for all sub-carriers are not approximately equal, then the weakest sub-carrier having a less than maximum list length is identified in block 510 and its list length is increased in block 512. List metrics are recomputed in block 504 and the process continues until all sub-carriers having less than maximum list lengths have approximately equal list metrics or until the computational resources are exhausted. The computation of the list metric may be computed directly from its defining equations, or it could be precomputed and quantized into a look-up table. The output of the look-up table would be the list length. For example, for a list metric $f(H_k,\sigma,L_k)$, and $\alpha(L_k)=1$ the list metric is not a function of $L_k$. In this case, the receiver can compute and quantize the list-metric $f(H_k,\sigma)$ to be the input to a look-up table whose output will be the list length $L_k$.

Figure 6:
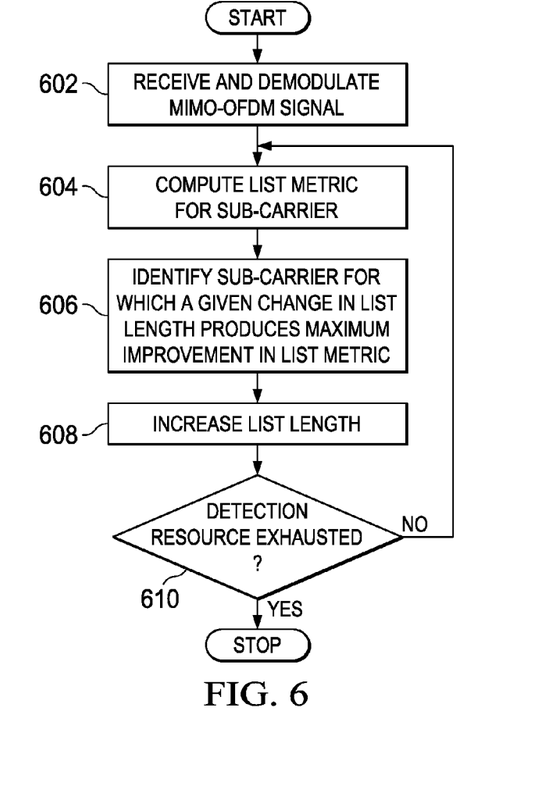
FIG. 6 shows a flow diagram for an alternate method for selecting a candidate list length in accordance with at least some preferred embodiments of the invention, when list metrics for all sub-carriers have been previously determined.

FIG. 6 shows a flow diagram for an alternate method for selecting a candidate list length using previously determined list metrics in accordance with at least some preferred embodiments of the invention. Though depicted sequentially as a matter of convenience, at least some of the actions shown can be performed in a different order and/or performed in parallel. In block 602, a MIMO-OFDM signal is received, downconverted to baseband and digitized. The digitized baseband signal is demodulated. The cyclic prefix is removed from each OFDM symbol and the symbol is transformed into the frequency domain to extract the OFDM sub-carriers.

List metrics are computed for all sub-carriers in block 604. The list metric is a measurement of how difficult it may be to correctly recover the bits for a sub-carrier. Probability of bit error and post-detection signal-to-noise ratio are examples of two possible list metrics. The present method increases the list length applied to a sub-carrier where the increase in list length will maximize the change in list metric. Thus, in block 606, the sub-carrier for which a given change in list length produces the maximum improvement in list metric is identified. Its list length is increased in block 608. If, in block 610, the computational resource available to perform detection is exhausted, then list length allocation is complete. Otherwise, list metrics are computed and list allocation continues in block 604. When further adjustments are required after detection resource exhaustion, in block 610, allocated list lengths may be adjusted to free computational resources.

Figure 7:
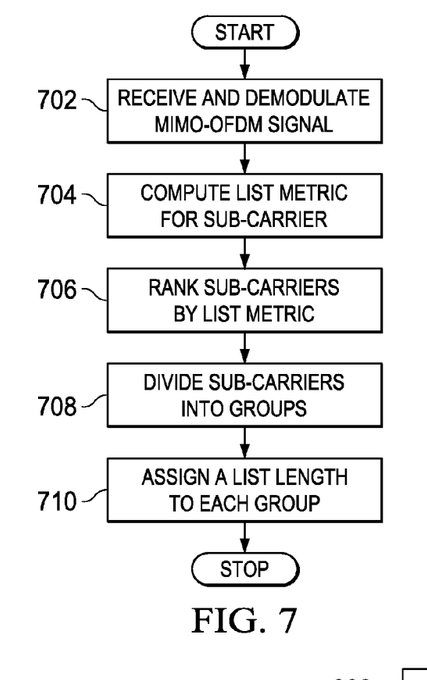
FIG. 7 shows a flow diagram for yet another method for selecting a candidate list length in accordance with at least some preferred embodiments of the invention, when list metrics for all sub-carriers have been previously determined.

FIG. 7 shows a flow diagram for yet another method for selecting a candidate list in accordance with at least some preferred embodiments of the invention, when list metrics for all sub-carriers are determined prior to list length assignment. Though depicted sequentially as a matter of convenience, at least some of the actions shown can be performed in a different order and/or performed in parallel. In block 702, a MIMO-OFDM signal is received, downconverted to baseband and digitized. The digitized baseband signal is demodulated. The cyclic prefix is removed from each OFDM symbol and the symbol is transformed into the frequency domain to extract the OFDM sub-carriers.

List metrics are computed for all sub-carriers in block 704. The list metric is a measurement of how difficult it may be to correctly recover the bits for a sub-carrier. Probability of bit error and post-detection signal-to-noise ratio are examples of two possible list metrics. In block 706, the sub-carriers are ranked by list metric. For example, the sub-carriers may be ordered according to increasing or decreasing list metric values. The ranked sub-carriers are divided into groups in block 708. Each group preferably encompasses a range of list metrics similar enough that the associated sub-carriers are amenable to detection using the same candidate list length or detector variant. In block 710, a list length is assigned to each group. That is, if using list detectors, each detector assigned to a sub-carrier represented by the group is assigned the same list length. If using a non-list detector, the same detector variety may be assigned to each sub-carrier that is a member of the group. For example, there could be three groups of tones; high quality, low quality, very low quality. High quality tones would be assigned a small amount of the receiver's resources, low quality tones would be assigned a larger amount of the receiver's resources, and in order to avoid wasting computational resources on the very low quality tones their list length is set to zero and the LLR of their bits is set to zero.

Figure 8:
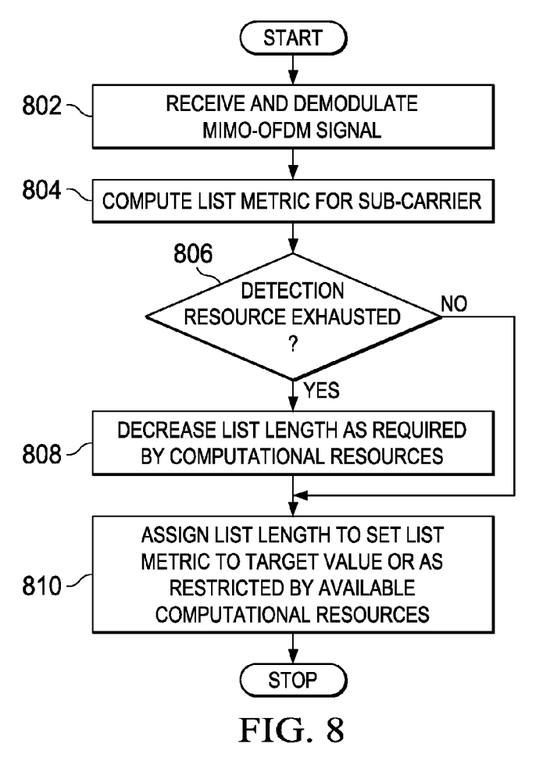
FIG. 8 shows a flow diagram for a method for selecting a candidate list length using a target list metric value in accordance with at least some preferred embodiments of the invention, when list metrics for all sub-carriers have not been determined.

FIG. 8 shows a flow diagram for a method for selecting a candidate list length in accordance with at least some preferred embodiments of the invention when list metrics for all sub-carriers have not been previously determined. Though depicted sequentially as a matter of convenience, at least some of the actions shown can be performed in a different order and/or performed in parallel. In block 802, a MIMO-OFDM signal is received, downconverted to baseband and digitized. The digitized baseband signal is demodulated. The cyclic prefix is removed from each OFDM symbol and the symbol is transformed into the frequency domain to extract the OFDM sub-carriers.

In some embodiments of the invention, list lengths are assigned and adjusted after the list metrics for all sub-carriers are determined so that computation resources can be distributed with knowledge of the channel conditioning on every sub-carrier. In practice, however, computing a list metric for all sub-carriers before assigning list lengths may introduce excessive latency. The present method allocates computational resources for each sub-carrier before the list metrics for all sub-carriers are known. Insofar as computational resources allow, a list length is assigned to each sub-carrier such that the sub-carrier's list metric attains a predetermined target value.

A list metric is computed for a sub-carrier in block 804. The list metric is a measurement of how difficult it may be to correctly recover the bits for the sub-carrier. Probability of bit error and post-detection signal-to-noise ratio are examples of two possible list metrics.

In block 806, the unallocated detection resource is evaluated. If sufficient computational assets are available (i.e. the detection resource is not exhausted), then a list length sufficient to set the sub-carrier's list metric to the target value is assigned in block 810. If, however, available computational resources are insufficient to allow allocation of sufficient list length to adjust the sub-carrier's list metric to the target value (i.e. the detection resource is exhausted), then, in block 808, the allocated list length may be decreased prior to assignment in block 810. For example, a list length restricted in accordance with the presently available computational resources may be allocated to the sub-carrier, or the list lengths previously assigned to other sub-carriers may be reduced to increase the list length available for allocation to the sub-carrier.

As previously disclosed, rather than allocating complexity by assigning list length to list detectors, complexity may be allocated by using different detector types. For example, a variation of the method of FIG. 8 allocates different detectors to the sub-carriers according to their list metrics. In this example, a higher complexity detector may be assigned to a sub-carrier whose list metric is less than the target value, and a lower complexity detector may be assigned to a sub-carrier whose list metric exceeds the target value. The mix of detectors assigned is constrained by the computational resource available to implement the detectors. Therefore, similar to the list length adjustments of block 808 above, at some point in the allocation of detectors to sub-carriers, an allocation adjustment may need to be made. For example, if a sub-carrier would preferably be assigned a high complexity detector, but the available computational resource is insufficient to support further high complexity detectors, then either a low complexity detector must be allocated to the sub-carrier, or a previously allocated detector may be switched from high to low complexity to free computational resources. Note that the use of a variety of detectors in lieu of variable list length is applicable to each of the allocation methods disclosed herein.

While illustrative embodiments of this invention have been shown and described, modifications thereof can be made by one skilled in the art without departing from the spirit or teaching of this invention. The embodiments described herein are illustrative and are not limiting. Many variations and modifications of the methods and apparatus are possible and are within the scope of the invention. Accordingly, the scope of protection is not limited to the embodiments described herein, but is only limited by the claims which follow, the scope of which shall include all equivalents of the subject matter of the claims.

What is claimed is:

1. A method for MIMO-OFDM detection comprising:
receiving a first MIMO-OFDM sub-carrier and receiving a second MIMO-OFDM sub-carrier;
assigning a first type of detector having a first complexity to estimate a symbol of the first MIMO-OFDM sub-carrier;
assigning a second type of detector having a second complexity to estimate a symbol of the second MIMO-OFDM sub-carrier, the first complexity being different than the second complexity;
computing a list metric for all sub-carriers prior to assigning a list length to a type of detector;
assigning a first list length to a the first type of detector and assigning a second list length to the second type of detector based on at least one assignment method selected from a group consisting of:
assigning the respective list length to the respective type of detector where the assignment maximizes the improvement in list metric over all sub-carriers;
assigning the respective list length to the respective type of detector processing a sub-carrier having the lowest list metric among all sub-carriers,
assigning the respective list length to the respective type of detector processing a sub-carrier to produce a target list metric for the sub-carrier;
assigning the respective list length to the respective type of detector processing a sub-carrier by ranking sub-carriers by list metric, dividing the ranked sub-carriers into groups, and assigning a same list length to each type of detector processing a sub-carrier of a group; and providing symbol estimates produced by the first type of detector and the second type of detector to a decoder.

2. A MIMO receiver, comprising:

a first type of detector that estimates a symbol of a first MIMO-OFDM sub-carrier;

a second type of detector that estimates a symbol of a second MIMO-OFDM sub-carrier, the second type of detector differs in complexity from the first type of detector;

a detector control block coupled to the first type of detector and coupled to the second type of detector, the detector control block assigns the first type of detector to process the first MIMO-OFDM sub-carrier and assigns the second type of detector to process the second MIMO-OFDM sub-carrier, wherein the detector control block computes a first list metric for the first sub-carrier and a second list metric for the second sub-carrier and wherein the detector control block assigns the respective list length to a the respective type of detector based on at least one assignment technique selected from a group consisting of:

assignment of the respective list length to the respective type of detector where the assignment maximizes the improvement in list metric over all sub-carriers;

assignment of the respective list length to the respective type of detector processing a sub-carrier having the lowest list metric among all sub-carriers, assignment of the respective list length to the respective type of detector processing a sub-carrier to produce a target list metric for the sub-carrier; and assignment of the respective list length to the respective type of detector processing a sub-carrier, where the sub-carrier is a member of a group of ranked sub-carriers, and the same list length is assigned to each type of detector processing a sub-carrier of the group.

3. The receiver of claim 2, wherein the detector control block assigns a minimal list length to the type of detector processing a sub-carrier having less than a threshold strength.

4. The receiver of claim 2, further comprising a device for communicating on a wireless network.

* * * * *